United States Patent [19]
Watson

[11] 3,871,399
[45] Mar. 18, 1975

[54] HOLDING TANK FOR CAMPERS

[76] Inventor: Clarence V. Watson, 4715 Rivercrest Dr., North, Salem, Oreg. 97303

[22] Filed: Mar. 26, 1973

[21] Appl. No.: 345,229

[52] U.S. Cl............... 137/344, 137/579, 137/585, 296/23 MC
[51] Int. Cl...................... B62d 33/04, B05b 15/06
[58] Field of Search............................ 4/1–5, 8, 10, 4/110, 114, 115, 207, 210, 219, 252 R, 11; 210/167, 169; 296/23 R, 23 MC; 137/344, 579, 585, 247.49

[56] References Cited
UNITED STATES PATENTS

| | | | |
|---|---|---|---|
| 1,731,531 | 11/1929 | Gott | 4/114 |
| 2,431,264 | 11/1947 | Lynett | 4/8 |
| 3,040,333 | 6/1962 | Merrill | 4/8 |
| 3,587,116 | 6/1971 | Quase | 4/115 |
| 3,594,825 | 7/1971 | Reid | 4/114 |
| 3,633,219 | 1/1972 | Byrd | 4/10 |
| 3,766,575 | 10/1973 | Grengs | 4/210 |

Primary Examiner—Henry T. Klinksiek
Attorney, Agent, or Firm—Kolisch, Hartwell, Dickinson & Stuart

[57] ABSTRACT

A waste fluid holding tank for use with a camper mounted on the bed of a pickup truck. The tank is constructed to fit within an open space on the bed of the trunk substantially in line with a wheel well cover which extends into the load-receiving region of the pickup. The space in which the tank is received is bounded on one end by the wheel well cover, on one side by a side wall of the pickup, and on the opposite side by a lower side portion of the camper. The tank has an inlet opening adjacent its bottom and a vent opening adjacent its top. An elongated drain conduit is connected at one of its ends to the inlet opening and is detachably connected at its opposite end to the drain in the camper. A vent conduit is connected at one of its ends to the vent opening and has such length that its other end may be secured above the drain in the camper when the tank is below the drain.

8 Claims, 3 Drawing Figures

PATENTED MAR 18 1975 3,871,399

HOLDING TANK FOR CAMPERS

BACKGROUND OF THE INVENTION

This invention relates to a fluid-receiving and holding tank for use with campers.

The use of campers, and particularly campers mounted on pickup trucks, has increased dramatically in recent years. Most campers have sinks and other fluid using devices in them from which waste fluids must be drained periodically. However, in many areas it is now illegal to drain such fluids from a camper directly onto the ground.

A general object of the present invention is to provide a novel holding tank for receiving and holding waste fluid until such time as the camper is moved to a suitable sewer facility where it may be emptied.

Many pickup trucks now are constructed with the side walls for the pickup box disposed outwardly of the rear wheels, with the wheel well covers extending inwardly of the side walls into the box. A camper which fits into such a pickup generally has lower side wall portions which are laterally spaced apart a distance less than the lateral spacing between the inner sides of the wheel well covers. When the camper is situated in the pickup box, an open space is provided in line with the wheel well cover, which space is bounded at one of its ends by the wheel well cover, and on opposite sides by a side wall of the truck and a lower side wall portion of the camper, respectively.

Another object of the invention is to provide a novel waste fluid holding tank which is constructed to fit within the open space in line with the wheel well cover and which fills a major portion of the space. Such a holding tank thus is able to utilize what otherwise would be wasted space and the same is captured and held by the surrounding side walls and wheel well cover.

Yet another object is to provide a novel holding tank assembly which can be installed and used with a pickup and camper combination without need for modification of either the pickup or camper.

DRAWINGS

These and other objects and advantages will become more fully apparent as the following description is read in conjunction with the drawings, wherein.

DETAILED DESCRIPTION OF AN EMBODIMENT OF THE INVENTION

Figure 1:
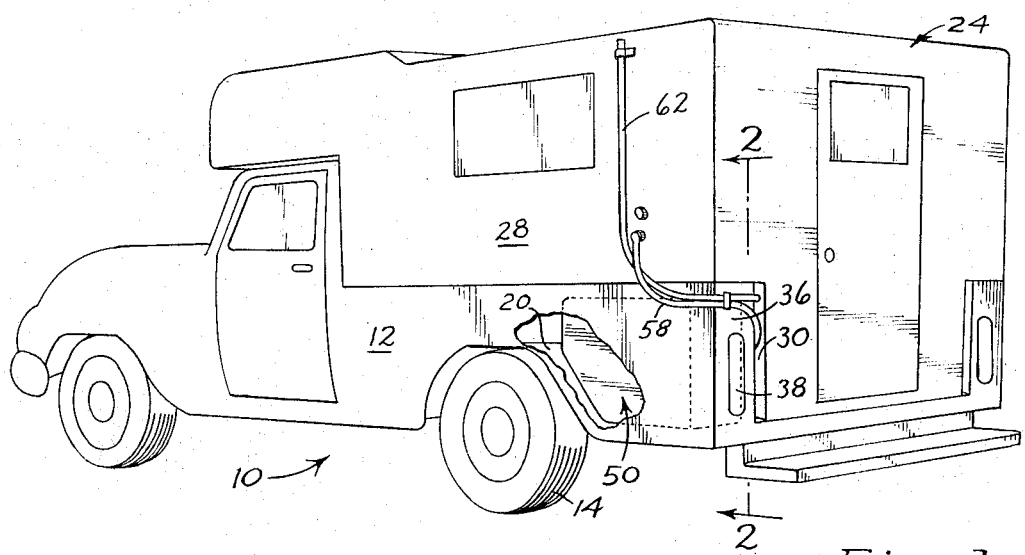
FIG. 1 is a perspective view of a pickup truck on which a camper is mounted, with a holding tank constructed in accordance with an embodiment of the invention in operative position.

Referring to the drawings, and first more specifically to FIG. 1, at 10 is indicated generally a pickup truck having a side wall 12 extending along one side thereof, laterally outwardly of a rear wheel 14 for the truck. Side wall 12 extends upwardly from one side of a horizontal floor 16 forming the bed for the truck and bounds one side of the box, or load-receiving space, at the rear of the truck.

Figure 3:
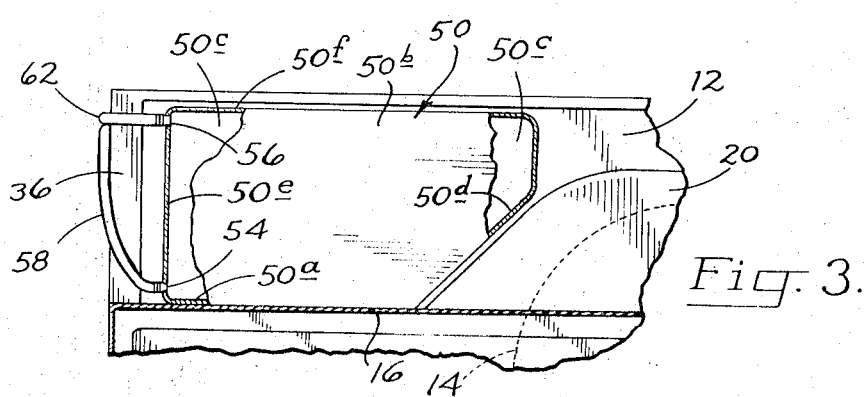
FIG. 3 is a view taken generally along the line 3—3 in FIG. 2, with portions broken away.

A wheel well cover 20 projects inwardly from side wall 12 between the front and rear ends of the box. As is best seen in FIG. 3, the rear end of the wheel well cover slopes forwardly in the truck (to the right in FIG. 3) on progressing upwardly from the floor.

A camper 24 rests on floor 16 within the load-receiving space of the truck. The camper has opposed upper side wall portions, such as that indicated generally at 28, and opposed lower side wall portions, such as that indicated generally at 30. The upper and lower side wall portions both extend substantially the length of the pickup box. The upper side wall portions of the camper are laterally spaced apart a distance substantially equal to the spacing of side walls 12, whereby an upper wall portion of the camper overlies a side wall 12 of the truck. The lower wall portions of the camper are laterally spaced apart a distance less than the distance between the opposed, inwardly facing sides of the wheel well covers, whereby a lower wall portion of the camper is spaced slightly inwardly from the wheel well cover.

Such pickup and camper construction provides an open space, indicated generally at 34, disposed rearwardly of wheel well cover 20, and bounded on opposite sides by side wall 12 of the truck and lower wall portion 30 of the camper. Another open space (not shown) is provided forwardly of the wheel well cover also. A rear stub wall 36, extending inwardly from the rear end of side wall 12 of the truck and mounting a taillight 38, partially bounds a rear side of the open space 34 at the rear end extremity of the truck.

Figure 2:
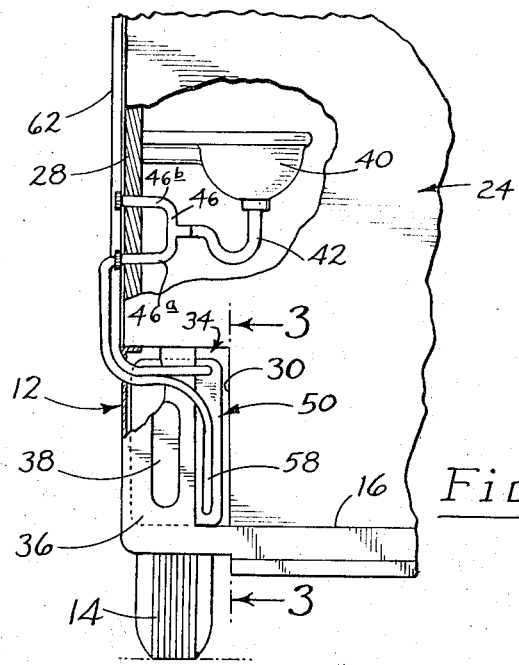
FIG. 2 is an enlarged view taken generally along the line 2—2 in FIG. 1, with portions broken away.

Referring to FIG. 2, at 40 is indicated a sink supported on wall 28 in the camper. The plumbing for the sink includes a drain having a P-trap 42 and a bifurcated drain and vent unit 46, also referred to as a double-putter unit. Unit 46 has a lower drain branch 46a and an upper vent branch 46b. Both branches 46a, 46b extend through side wall portion 28 of the camper and terminate a short distance outside the camper.

At 50 is indicated generally a holding tank according to the invention constructed of liquid impervious material. The tank is an elongate hollow body having a substantially flat bottom, or base, 50a, opposed upright side walls 50b, 50c projecting upwardly from opposite sides of bottom 50a, a front end wall 50e extending between side walls 50b, 50c, a rear end wall 50e, and a top wall 50f extending between the opposed side walls and the front and rear end walls. Adjoining edges of the various walls are integrally joined together to form a liquid impervious enclosure.

The bottom 50a is slightly shorter than the distance between the rear end of wheel well cover 20 and stub wall 36 at the rear end extremity of the truck. Side walls 50b, 50c are laterally spaced apart a distance slightly less than the distance between side wall 12 of the truck and wall portion 30 of the camper. The front end wall 50d inclines longitudinally outwardly from the bottom, to the right in FIG. 3, on progressing upwardly therefrom. The contour of the tank is such that it fits within and fills a major portion of space 34 bounded by the wheel well cover, side wall 12 of the truck and wall portion 30 of the camper. The sloping front wall of the tank extends in superposed relation over the rear sloping portion of wheel well cover 20.

An inlet, or fill, opening, or port, 54 extends through rear wall 50e adjacent the bottom of the tank and a vent opening, or port, 56 extends through rear wall 50e adjacent the top of the tank.

An elongated, flexible drain tube, or conduit, 58 is connected at one of its ends to inlet opening 54, and is detachably connected at its opposite end to lower, or drain, branch 46a of the double-putter unit. An elongated, flexible vent tube, or conduit, 62 is connected at one of its ends to vent opening 56, extends from the top of the tank along the outside of the camper, and is secured at its opposite end above sink 40.

Describing the operation of the apparatus, the tank is positioned substantially in line and rearwardly of wheel well cover 20 in space 34. In this position it is captured and maintained in position by surrounding structure.

With conduit 58 connected at its opposite ends to drain branch 46a and inlet opening 54 of the tank, when waste liquid is drained from the sink it flows into and is held in tank 50. Gas displaced from the holding tank by the liquid is vented through conduit 62.

Upon reaching a sewer facility, where the holding tank can be emptied, it is a simple matter to disconnect the upper end of conduit 58 from drain branch 46a, and lower it below the elevation of inlet opening 54, thus to drain fluid from the tank under gravity.

While a preferred embodiment of the invention has been described herein, it should be apparent to those skilled in the art that variations and modifications are possible without departing from the spirit of the invention.

It is claimed and desired to secure by Letters Patent:

1. In combination with a pickup truck having a rear pickup box with wheel well covers projecting into the box and positioned between the ends of said box, and a camper with plumbing therein mounted in said box with an external lower side wall of the camper extending substantially the length of the box, disposed inwardly of a wheel well cover, and spaced from an adjacent side of said box,
    a holding tank positioned between said camper's lower side wall and said adjacent side of said box and disposed toward an end of said box from said wheel well cover,
    a drain conduit for draining said plumbing and means detachably connecting said drain conduit to the plumbing of the camper, said drain conduit communicating with the interior of said tank adjacent the base of the tank, said drain conduit with release of said means detachably connecting the drain conduit to said plumbing being adjustable to provide for drain flow under gravity from said tank, and
    vent conduit means connecting with said tank extending upwardly along the outside of said camper.

2. The combination of claim 1, wherein said tank has an inclined end wall which extends in superposed relation over a side of said wheel well cover.

3. The combination of claim 1, wherein said camper has an upper side wall disposed above its said lower side wall and said camper plumbing includes an exterior drain opening in said upper side wall of the camper into which liquid from the camper plumbing is directed, and said drain conduit comprises tubing extending from said exterior drain opening to said tank.

4. The combination of claim 3, wherein said means detachably connecting the drain conduit to the plumbing of the camper comprises means detachably connecting said tubing to said exterior drain opening.

5. The combination of claim 1, wherein said camper plumbing includes a bifurcated drain unit opening to the exterior of said camper through vent and drain openings, and said drain conduit comprises tubing extending from said drain opening to said tank.

6. The combination of claim 3, wherein said plumbing of the camper includes a sink with a sink drain opening and said vent conduit means extends from the top of said tank upwardly along the outside of said camper to a region above the sink drain opening.

7. An assembly for collecting waste liquid from the exterior drain opening of a camper unit supported in the box of a pickup wherein said pickup has an internal wheel well cover, the assembly comprising
    an elongate hollow tank with opposed side walls, opposed end walls, and a top and a bottom providing a substantially enclosed storage space,
    one of said end walls including an inclined bottom portion adapted to be positioned over the wheel well cover of a pickup, and
    a pair of flexible conduits joining with said tank, one conduit having an end connecting with the interior of the tank adjacent the base of the tank and the other conduit having an end communicating with the interior of the tank adjacent the top of the tank, said one conduit including an end opposite the end communicating with said tank provided with a coupling for detachable connection with an exterior drain opening of a camper unit.

8. The assembly of claim 7, wherein said one and said other conduits communicate with the interior of tank at the end of the tank opposite said end wall which includes the inclined bottom portion.

* * * * *